United States Patent [19]

Rhodes et al.

[11] Patent Number: 5,287,456
[45] Date of Patent: Feb. 15, 1994

[54] COMMUNICATION SYSTEM FOR FACILITATING IN FULL DUPLEX COMMUNICATION MODE AND WITHOUT PREVIOUSLY DEFINING SESSIONS BETWEEN SENDER AND RECEIVER PROGRAMS

[75] Inventors: Murden C. Rhodes; Jen S. Wang, both of Raleigh, N.C.

[73] Assignee: International Business Machines Corporation, Armonk, N.Y.

[21] Appl. No.: 698,351

[22] Filed: Apr. 22, 1991

Related U.S. Application Data

[63] Continuation of Ser. No. 261,212, Oct. 24, 1988, abandoned.

[51] Int. Cl.$^5$ .............................................. G06F 13/14
[52] U.S. Cl. ................................. 395/200; 364/DIG. 1;
         364/229.5; 364/230.4; 364/239.51; 364/241.7
[58] Field of Search .................................. 395/200, 325

[56] References Cited

U.S. PATENT DOCUMENTS

| | | | |
|---|---|---|---|
| 3,614,745 | 10/1971 | Podvin et al. | 395/650 |
| 4,245,306 | 1/1981 | Basemer et al. | 395/325 |
| 4,333,144 | 6/1982 | Whiteside et al. | 395/650 |
| 4,418,382 | 11/1983 | Larson et al. | |
| 4,694,396 | 9/1987 | Weisshaar et al. | |
| 4,698,766 | 10/1987 | Entwistle et al. | 395/82 |
| 4,769,771 | 9/1988 | Lippmann et al. | 395/200 |
| 4,807,116 | 2/1989 | Katzman et al. | 395/200 |

OTHER PUBLICATIONS

Anderson et al.; "Computer Interconnection Structure: Taxonomy, Characteristics, and Example"; Computing Surveys, vol. 7, No. 4, Dec. 1975; pp. 198–216.

Unknown "Join Micros Into Intelligent Networks"; Electronic Design 5; Mar. 1, 1975, pp. 52–57.

Werner, "A Method for Inter-Process Communication in Loosely Coupled Multi-Microcomputer Systems", Conference in Budapest, Hung., Oct. 18–21, 1983, pp. 568–577.

Edward (Tandem Comput. Inc.), "Time-Staged Delivery Networks Save Time, Enhance Productivity", Data Communication, vol. 15, No. 2, Feb. 1986, pp. 147–150.

Marinescu, "Inter-Process Communication in MVS/XA and Applications for Scientific and Engineering Information Processing", Software-Practice and Experience, vol. 16, No. 5, May 1986, pp. 489–501.

Primary Examiner—Parshotam S. Lall
Assistant Examiner—Krisna Lim
Attorney, Agent, or Firm—Edward H. Duffield; Gregory M. Doudnikoff

[57] ABSTRACT

A method of facilitating program to program communication within memory space managed by a given processor. Would-be sender programs communicate with would-be receiver programs via an intermediate communication facility program acting as a central "post office" for the sender and receivers. Receiver programs identify themselves and their status to the communication facility program by registering their identification and status therewith. Thereafter, any would-be sender programs can send messages or data to any receiver programs which have been defined to the communication facility program much as any post office patron can receive mail addressed to the patron. Senders need not be defined to the communication facility program but need only request delivery of data or a message to a targeted receiver.

8 Claims, 11 Drawing Sheets

COMMUNICATION SYSTEM FOR FACILITATING IN FULL DUPLEX COMMUNICATION MODE AND WITHOUT PREVIOUSLY DEFINING SESSIONS BETWEEN SENDER AND RECEIVER PROGRAMS

This is a continuation of Ser. No. 261,212, filed Oct. 24, 1988, now abandoned.

FIELD OF THE INVENTION

This invention relates to computer programming techniques and to methods of exchanging information between sender and receiver programs running in a single computer.

PRIOR ART

A variety of program to program communication techniques are known. For example, the IBM program to program communication facility is of this type. To use this facility, a user program must first be defined in a table and sender and receiver programs must establish a "session" before they can begin communicating with one another. When a receiver program wishes to communicate by receiving data from more than one sender program, it has to maintain an individual "session" with each of the partner sender programs. If the session established is broken, or if the receiver program becomes no longer active, the sender program cannot send data and thus may reach an impasse in its own operation. Additionally, in this type of system, a communication session can only be used in a half duplex mode, i.e. in a unidirectional mode at any time. For example, when program A is sending data to program B, program B cannot send data A on the same session at the same time. In order to send data, Program B must first receive the data from Program A, then request permission to send, receive permission to send and then begin sending data to program A. In other words, the communication session has to be turned around to redefine sender and receiver. Additionally, under this system, a sender program can only send one data buffer of information to a receiver program at a time and then must wait for the receiver program to receive that buffer full of information before it can send another data buffer of information.

In the communications field in general, a potential solution exists for machine to machine communications in the form of a "post office box" in which designated machines can communicate with each other by leaving messages for one another in a commonly accessible memory. Such a system is described on page 204 of the article "Computer Interconnection Structures: Taxonomy, Characteristics, and Examples" by George A. Anderson and E. Douglas Jensen appearing in Computing Surveys, Vol. 7, #4, December 1976, pages 197-213, although no specific implementation is described. A specific implementation of this type of system is shown, however, in Electronic Design, Vol. 5, Mar. 1, 1975, pages 52-57, at page 54 FIG. 4 where master to master communication between microprocessors may be facilitated by a common memory. In such systems, the communication between the elements is predetermined by each master microprocessor. Each master is able to contact another processor or processors when it needs to communicate directly via the common memory. Each processor gains access to the common memory by some fixed priority scheme to avoid conflicts over the use of the memory bus. A processor that gains access to the common memory, locks out all other would-be communicators. It knows by prior arrangement the location of a "mail box" for the desired target recipient and the sending program indicates to which other master processor it wishes to communicate a message by placing a status or alert character within the desired recipient's "mail box". The communicating processor must either deposit the information to be communicated into a known fixed area of common memory or indicate the location and length of the message that it has stored. When the communicating processor has set up the transfer, it signals to the other constituents that the transfer is to take place by use of a common on-system interrupt received by all processors.

While these systems exhibit some similarity in concept to the invention to be described herein, it will be noted that each processor is required to know the location of intended recipient processors, must be able to gain access to a bus, will lock out communication from any other contenders, must know the location in memory where intended messages are to be stored or must have a means of indicating (to any intended recipient) where they are stored, and then must notify each of the other processors that a message awaits one of them so that, upon later checking, the desired recipient will learn that it has information in its "mail box". These are significant drawbacks since the sending processor must have a full knowledge of the system, i.e. the identities of other processors and their assigned spaces in "mail box" memory and must have a means of communicating generally with the other processors outside the realm of the mail box in order to alert them that a message awaits.

In view of the foregoing difficulties with prior art systems for program to program or processor to processor communication, it would be most desirable if the requirement for identifying senders and receivers and for establishing a session and providing controls over such a communicating session could be avoided. It would also be desirable to facilitate a full duplex mode of communication rather than a half duplex mode inherent in the aforementioned prior art. The capability of sending to an inoperative receiver would also be highly useful, since it would avoid having a sender await availability of the desired recipient.

OBJECTS OF THE INVENTION

In light of the foregoing known deficiencies with the prior art, it is an object of this invention to provide an improved program to program communication facility operative within the context of a computer system for facilitating message exchanges between senders and receivers in a full duplex mode.

Yet another object of the present invention is to provide an improved method of program to program communication that does not require establishment of a defined session between sending and receiving entities.

Yet another object of this invention is to provide an improved sender to receiver communication technique that does not depend upon the present availability of the receiver.

These and still other objects not specifically enumerated are met as will now be discussed briefly.

BRIEF SUMMARY

The preferred embodiment of the present invention is implemented by providing a program to program communication facility which itself may be a program resident within memory and executable by a processor. Within the same memory, would-be sender and receiver programs may be defined to exist. A sender program, having a buffer of data known to be desired by a receiver, or which the sender desires to deliver to the receiver program may simply be delivered to the program to program communication facility program in much the same manner that an addressed piece of mail is delivered to a post office for eventual delivery. The sender program does not have to await the availability of its intended receiver and does not have to know the physical location where the intended receiver may reside. All that is required is that each would be receiver program must register itself with the program to program communication facility program. Thus no "sessions" are established. Receivers merely register their availability and identification with the program to program communication facility. Then when messages destined for a given receiver are transmitted by a given sender to the program to program communication facility, the communication facility stores the messages in "mail boxes" to be later retrieved by would be receiver programs when they are alerted by the program to program communication facility that a message awaits them.

The preferred embodiment will be described in greater detail with reference to several figures of the drawing in which:

DETAILED DESCRIPTION OF PREFERRED EMBODIMENT

Figure 1:
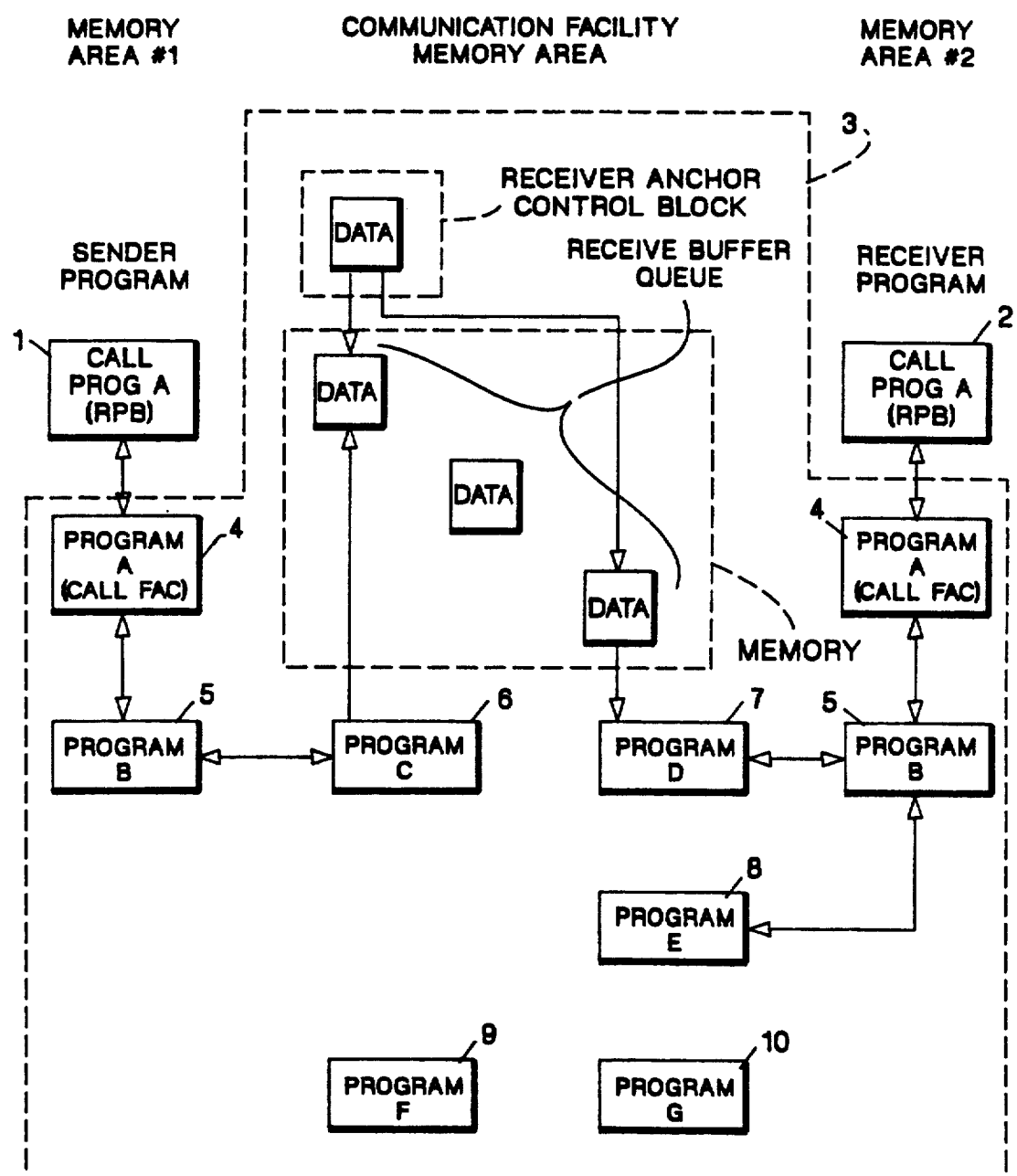
FIG. 1 illustrates the architectural layout and flow of messages from a first program resident within an area of memory within a computer system to a communication facility program resident within another area of the same memory and from the communication facility program to a receiver program also resident within the same memory.

It will be appreciated by those of skill in the art that the preferred embodiment of the invention that will be described shortly may be applicable not only to program to program communication techniques within a single computer, but might be utilized to facilitate computer to computer communication techniques as well. In general, the system of the preferred embodiment of the invention involves senders, receivers and an intermediate agent generally described as the "communication facility".

In the preferred embodiment that will be described, the senders and receivers are assumed to be application programs resident within memory in a single computer system and the intermediate communication facility to which messages are delivered and from which they are retrieved is also a program resident within the same computer system memory.

The process of communication is relatively simple. A would-be receiver must first register itself with the communication facility program just as would-be mail recipients must register with the post office. The receiver issues an initialization request to the communication facility to establish its identity and to alert the communication facility that it exists and is available for the receipt of messages. The receiver may specify whether it is to receive messages from any sender or only from certain categories of senders, may specify a limit for the number of data buffers of information that should be held in a queue, and can retrieve its data for processing whenever it is ready to do so.

A transmitter or sender program must issue a transmission request command to the communication facility to inform the communication facility that a data transfer task is to be done. The communication facility program either accepts or rejects messages from would-be senders depending upon whether it realizes that the intended recipient is present in the system. The communication facility also notifies the intended receiver that a message awaits it and it notifies the would-be transmitter of the specific receiver's status at the time, i.e. whether it is available and receiving messages or whether it is not registered with the communication facility. To obtain messages, a receiver issues a request to receive to the communication facility which then copies an awaiting message to a location specified by the receiver in the receiver's memory.

In this technique, it may be readily appreciated that the process is asynchronous in that the sender and receiver do not need to be synchronized with one another; it is also clear that a full duplex mode of message exchanges is possible with both the sender and the receiver simultaneously delivering messages for one another to the intermediate communication facility. Each sender or receiver always presents a request command to the communication facility to begin its transmission or reception. Any transmitter can send a message to the communication facility without having preregistered itself, since it is only the receivers that need to be registered. The communication facility, much like a post office, will accept messages or reject messages depending upon whether the intended recipient is known to it or not.

This technique avoids the use of intermediate controls in the form of "system session" establishment and allows any program to send to a given recipient program without setting up a session therewith. In addition, the program can send as many messages as it desires and does not have to await reception by the intended receiving program. A sender program can even send data to a receiver program when the receiver program is not currently running, although it is registered with the communication facility program and resident in the system. The communication facility program can accept and hold data for an intended receiver and return a status code to notify the sender program that the receiver is not currently active.

A variety of capabilities and advantages will become apparent as this discussion continues.

A preferred embodiment of the invention will be described with reference to an environment in which senders, receivers, and the intermediate communication facility are all computer programs resident in various individual areas of the same memory within a computer system serviced by a processor. The processor may have multitasking capability, i.e. the capability of running several programs simultaneously, or may not. The chief requirement is that all of the programs exist within memory space handled by and accessible to the same computer system. If computer to computer communication is desired, then at least the communication facility program must reside in the computer that will be handling the "post office" functions for other computers that wish to access one another via this method.

The preferred embodiment, however, exists within an architectural setting as shown with reference to FIG. 1. In FIG. 1, a sender program 1 is depicted to exist within a defined area #1 of computer system memory and a receiver program 2 is defined to exist within an area #2 of the same computer system memory. The sender and receiver programs may be different user programs which have a need and/or desire to exchange data buffers of information with one another for purposes of facilitating computations to be carried out or additional tasks to be performed in response to results provided by one or another. The intermediate communication facility program 3 also resides within yet another defined area of the same memory facilities served by the same processor.

As shown in FIG. 1, the sender program 1 initiates the process of sending by issuing a "call program X Request Parameter Buffer", (RPB). This is a high level standard programming call interface with specific Request Parameter Buffer (RPB) contents or fields as described in Table 1.

TABLE 1

| Position (byte) | Data Field |
|---|---|
| 1-4 | RPB-LEN |
| 5-6 | TYPE |
| 7-8 | RECOPT |
| 9-12 | RETCODE |
| 13-16 | WORK-ADR |
| 17-24 | SENDER-ID |
| *17-20 | ASCB-ADR |
| *21-24 | ECB-ADR |
| *21-24 | BUFFQ-L |
| 25-32 | RECEIVER-ID |
| 33-36 | BUFF-LEN |
| *33-34 | AUTH-IND |
| 37-40 | BUFF-ADR |
| *37-40 | TCB-ADR |

*Note: ASCB-ADR and ECB-ADR overlap SENDER-ID.
AUTH-IND overlaps the first two-byte of BUFF-LEN.
TCB-ADR overlaps the BUFF-ADR.

This type of communication facility can be used generally with any high level or assembler programming language having the capability of supporting a standard program call interface. The requirements and functional capabilities of the call interface will be described in greater detail herein.

Figure 2:
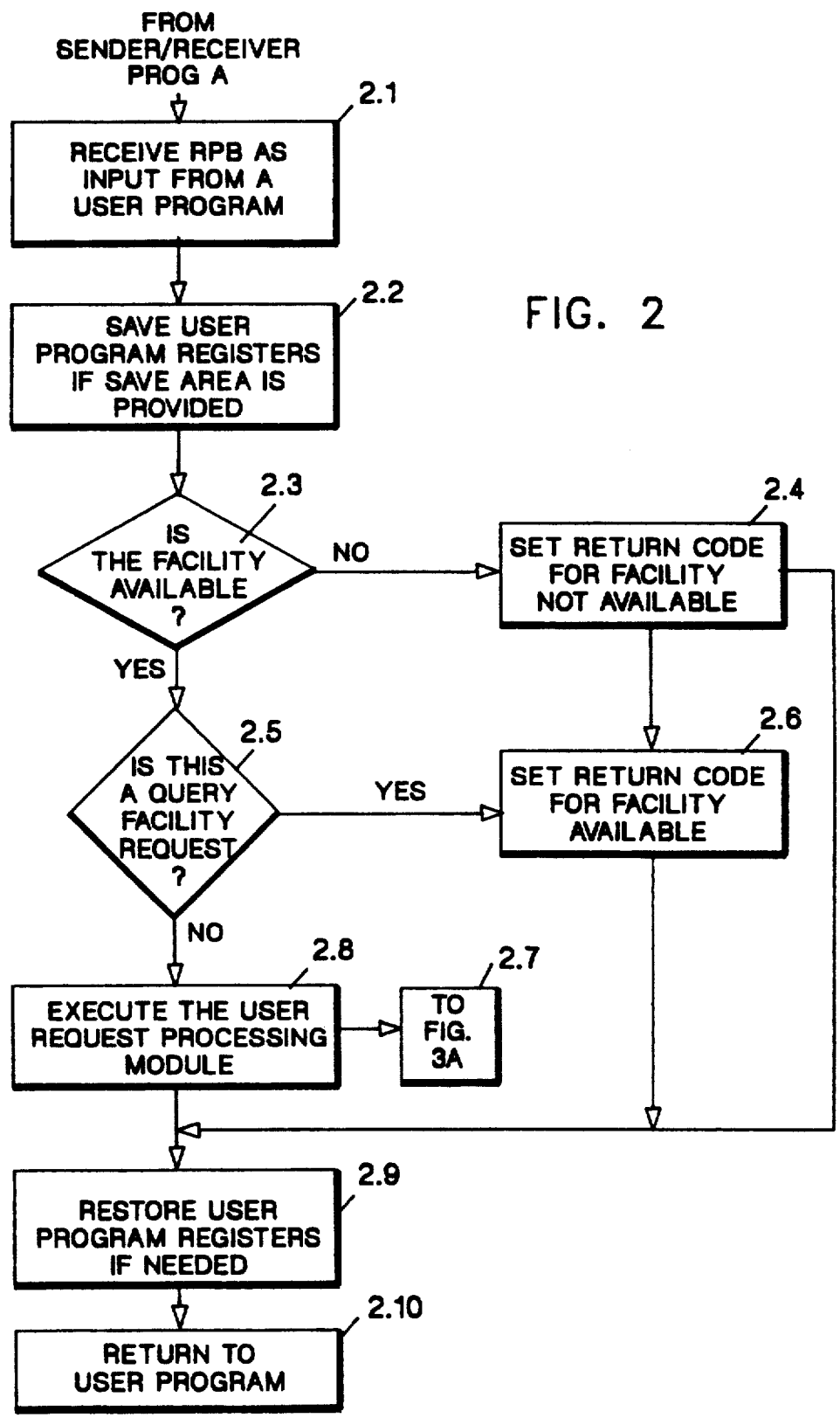
FIG. 2 illustrates a detailed flow chart of that portion of FIG. 1 denoted as program A.
Figure 3A:
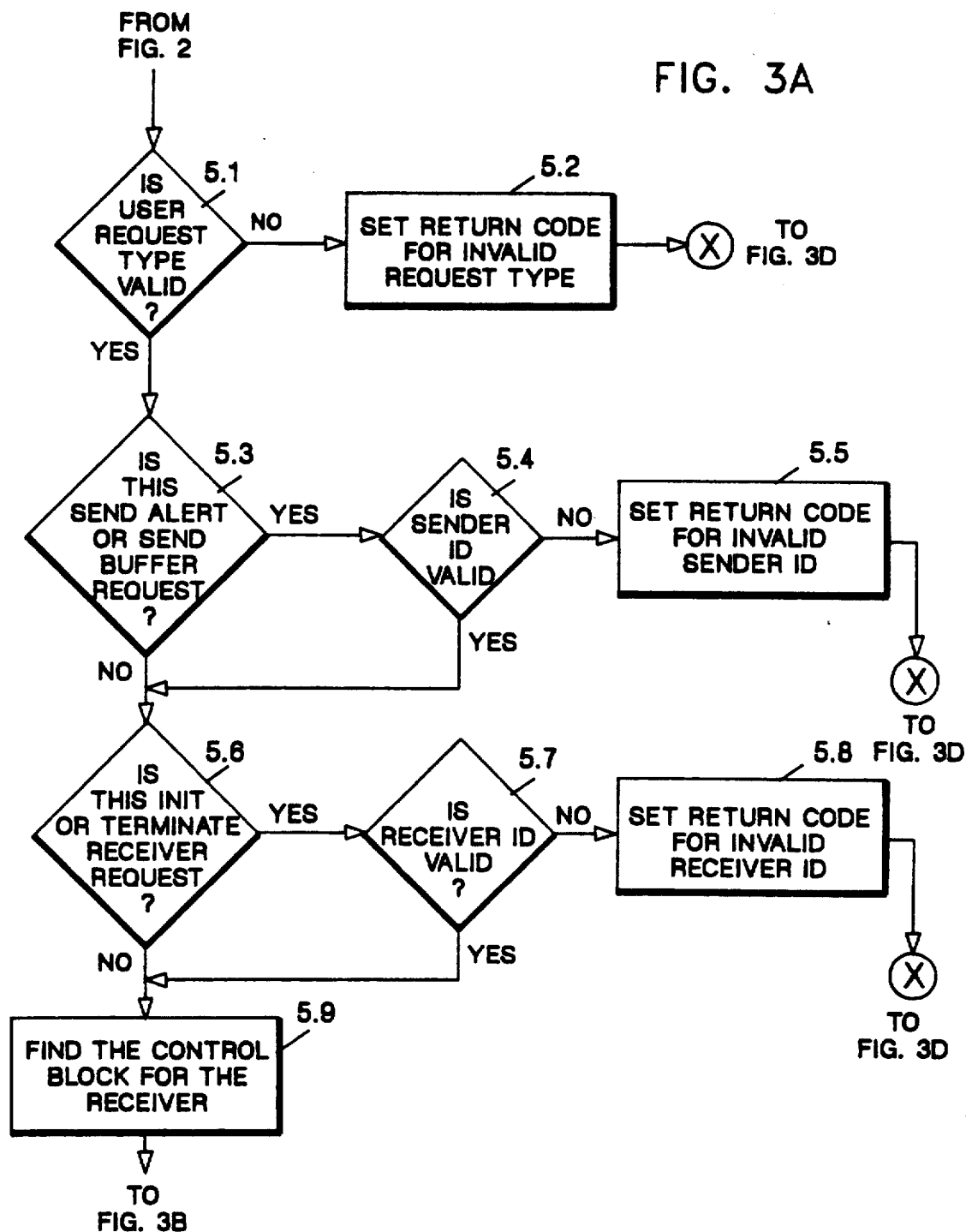
FIG. 3, consisting of parts 3A through 3D arranged as shown in FIG. 3, illustrates a flow chart for that portion of FIG. 1 denoted as program B.
Figure 3B:
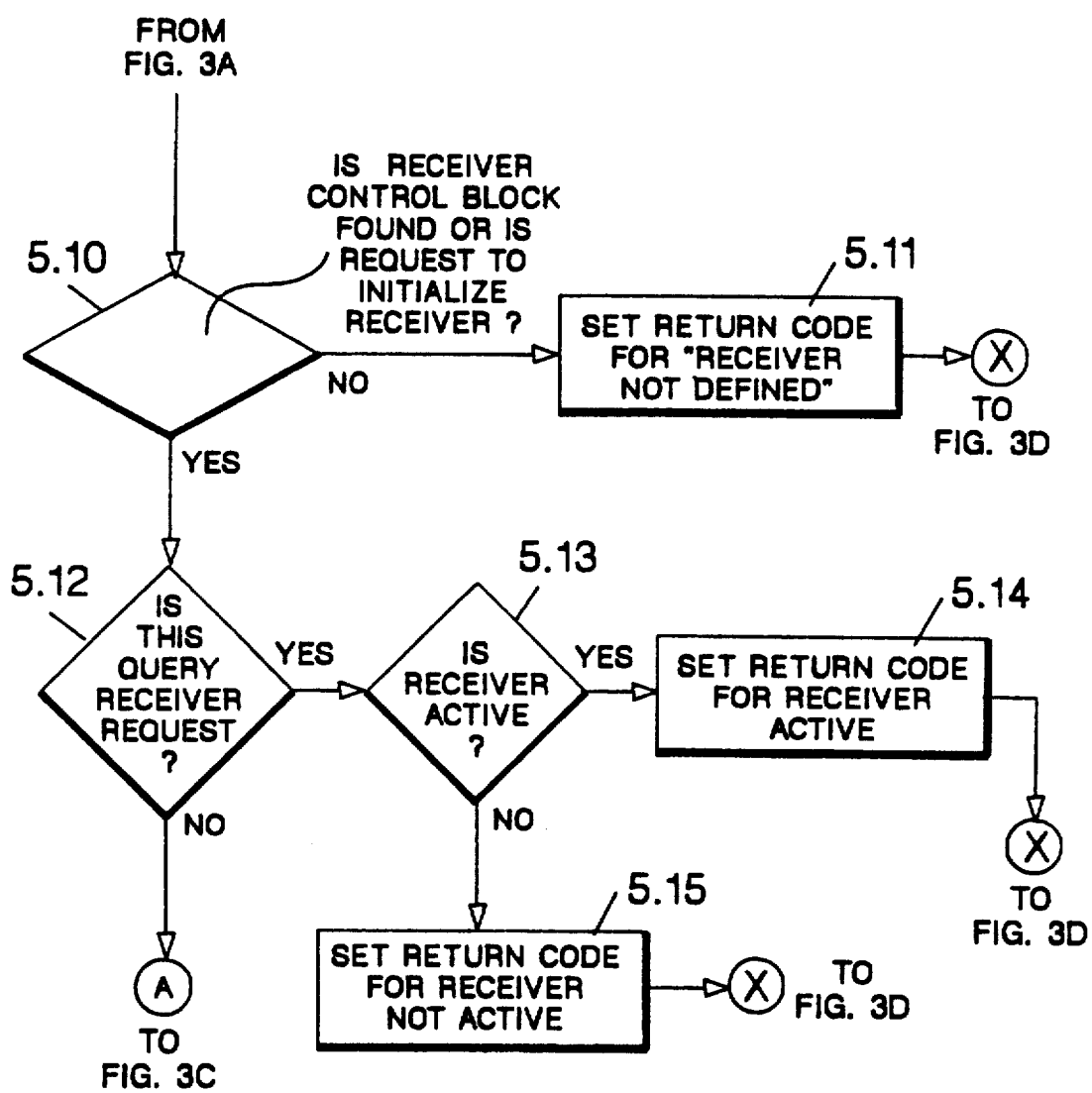
Figure 3C:
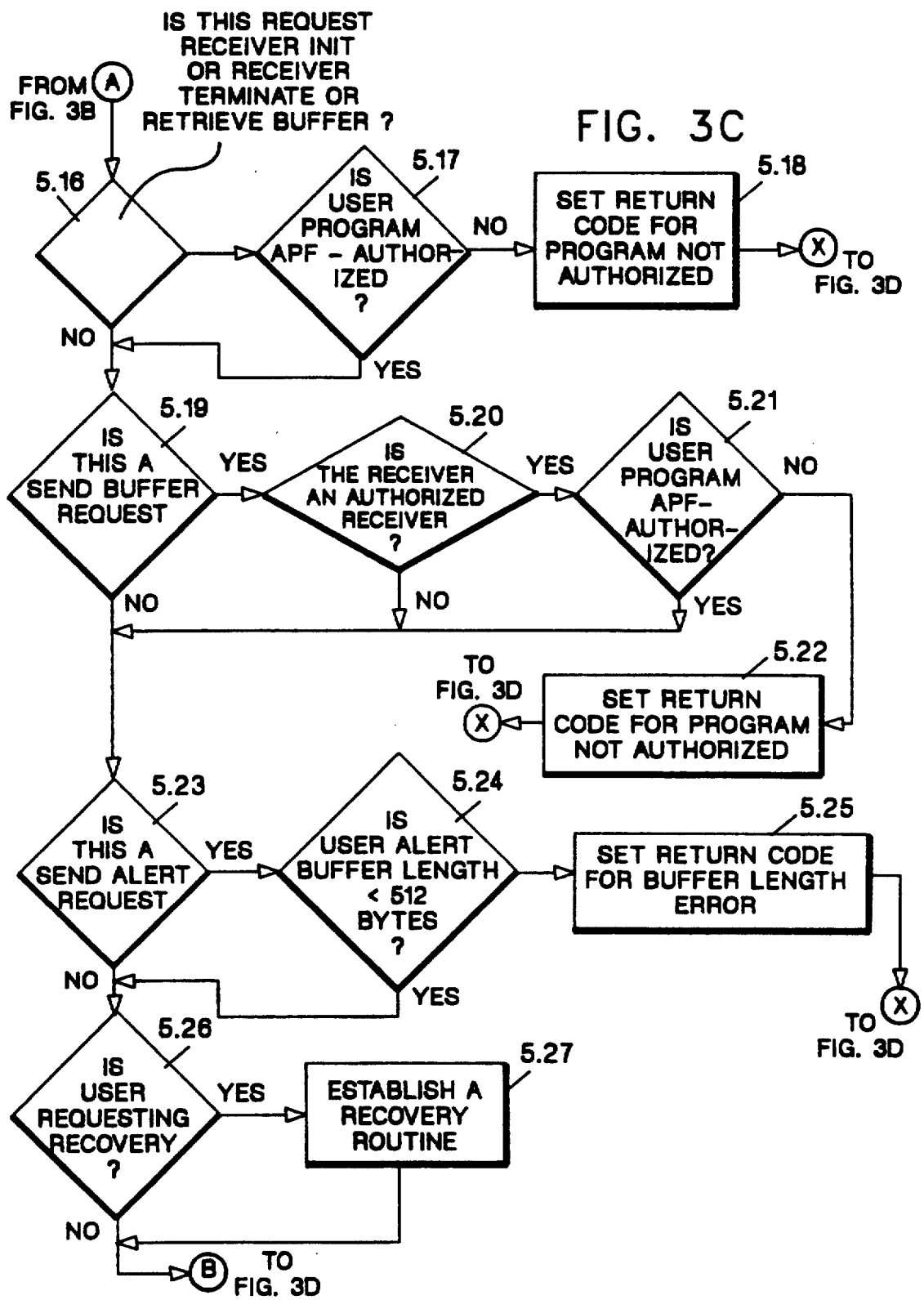
Figure 3D:
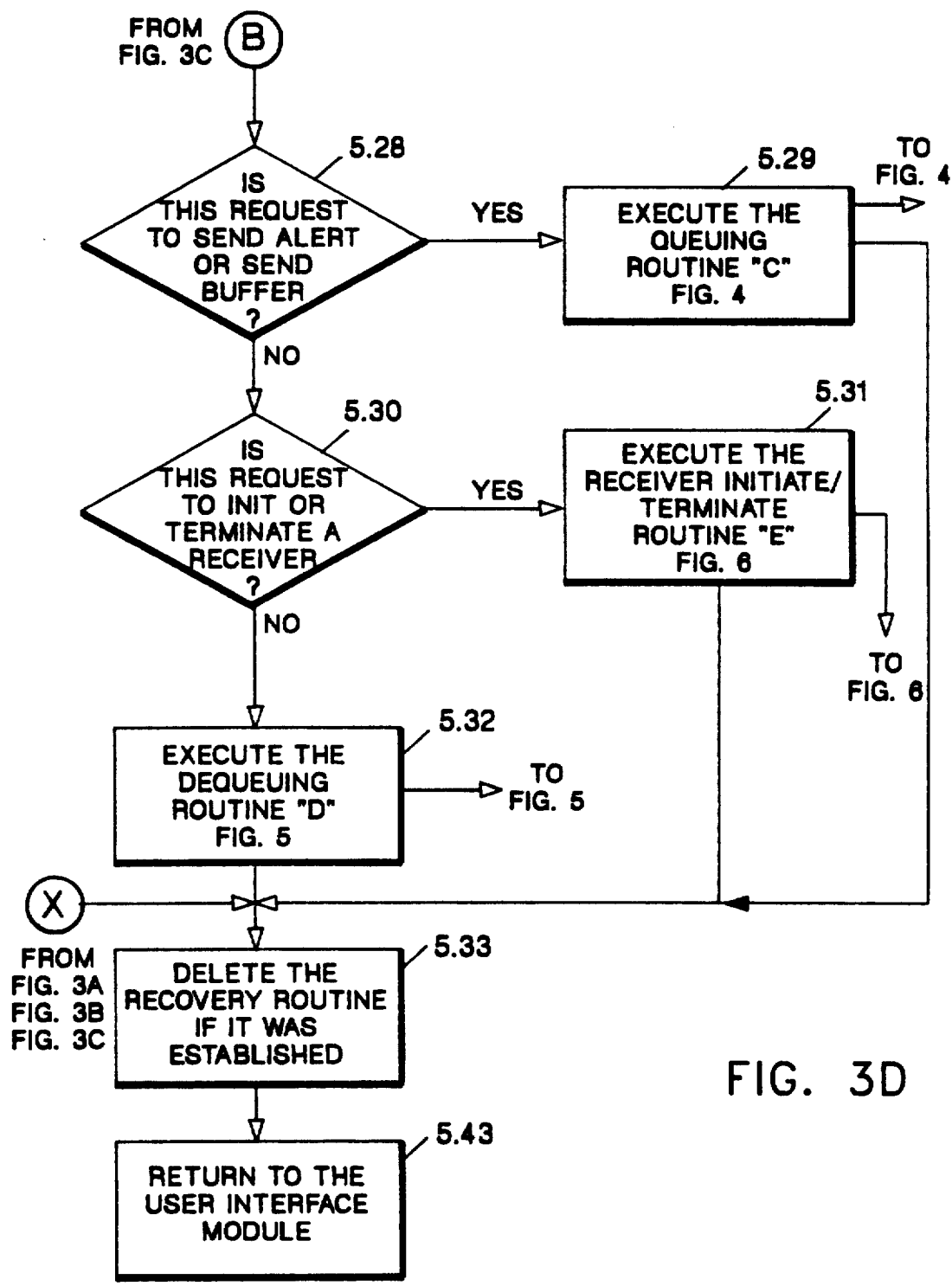

As shown in Table 1 above, the request parameter buffer (RPB) fields have arbitrarily defined byte format meanings, all of which will be defined in greater detail herein. The call facility (call FAC) is actually implemented by Program A as shown as box 4 in FIG. 1 detailed in FIG. 2 is executed whenever the user program issues a CALL to Program A to use the communication facility. Program A is defined in greater detail in FIG. 2; however, Program A is executed whenever the user program, i.e. a sender or a receiver program issues a "call" command. Program A will check to see in box 2.3 if the intermediate communication facility program 3 (FIG. 1) and Program B in FIG. 1 box 5 are active and will, if Program B is active, cause in boxes 2.3, 2.5 and 2.8 FIG. 2 Program B to be executed at once. Otherwise, a return code will be set in box 2.4, FIG. 2 and Program A will regain control and notify the user program that the communication facility is not available at this time.

The general flow for operations will be described with respect to the schematic shown in FIG. 1. Assuming that Program A's check in box 2.3, FIG. 2 of availability for the intermediate communication facility program and Program B are positive, Program B will be executed.

Program B, as shown FIG. 3, performs the following processes. First it validates in 5.1 the user request type as a type that is recognized by prior arrangement. It also verifies 5.17 and 5.20 that the user program is an authorized program (if it is a request of the type that requires authorization as will be described in greater detail later). Also, if the user's request requires a check on a given receiver, Program B will verify to see whether the receiver has been defined 5.10 at the communication facility and in 5.13, whether it is currently active or not. Program B will also check to see whether a user program's request is to set a receiver inactive in 5.6 and will verify in 5.7 and 5.10 that the intended receiver has, in fact, already been defined in the communication facility memory area. If the user program's request is to send a data buffer in 5.3 and 5.19, Program B verifies in 5.9 and 5.10 that the intended receiver has been defined already in the memory area assigned for the communication facility. If the user program request is to send an alert in 5.3 and 5.23 to a network management program, Program B verifies 5.9 and 5.10 that the management program has been defined as a receiver in the communication facility memory area. Also, Program B will verify in box 5.20 and 5.21 that a sender program is an Authorized Program Facility (APF) authorized program when a user program's request is to send a data buffer of information to a receiver program which is initialized as an authorized receiver. Additionally, Program B establishes in 5.26 and 5.27 a recovery routine if it is requested. This routine, if an abnormal termination occurs, will be executed and will return control to the requesting user program. Depending upon the type of request presented by the user program, Program B will execute the communication facility program resident within the intermediate memory Program C (in box 5.29), D (in box 5.32) and E (in box 5.31) depending specifically upon the particular request type.

Figure 4:
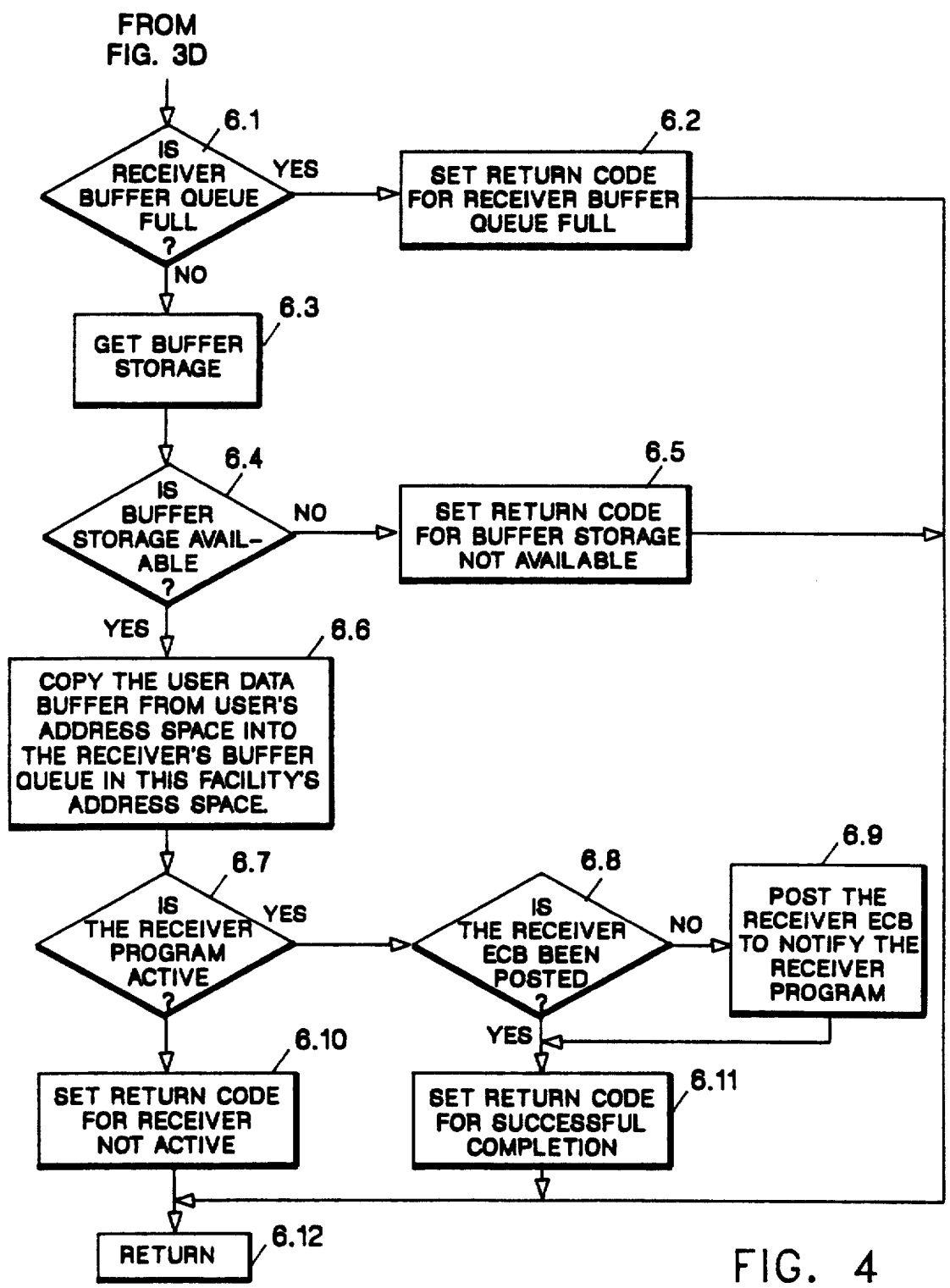
FIG. 4 illustrates that portion of FIG. 1 denoted as program C.

Program C in FIG. 4 is executed in response to actions taken by Program B to process user requests of certain types 12 and 14 that will be described in greater detail later. Program C obtains in 6.3, FIG. 4 a data storage area within the intermediate memory area of the communication facility program for holding the user's data buffer of information. Program C then copies in 6.6, FIG. 4 the user's data buffer information from the user memory area of the sending program into the intermediate memory area of the communication facility program. Then, if the intended receiver program is active in box 6.7, FIG. 4 and the receiver's execution control block has not been set in 6.8 to indicate that a message awaits the given receiver, the receiver's control block will be set in 6.9 to so indicate.

Figure 5:
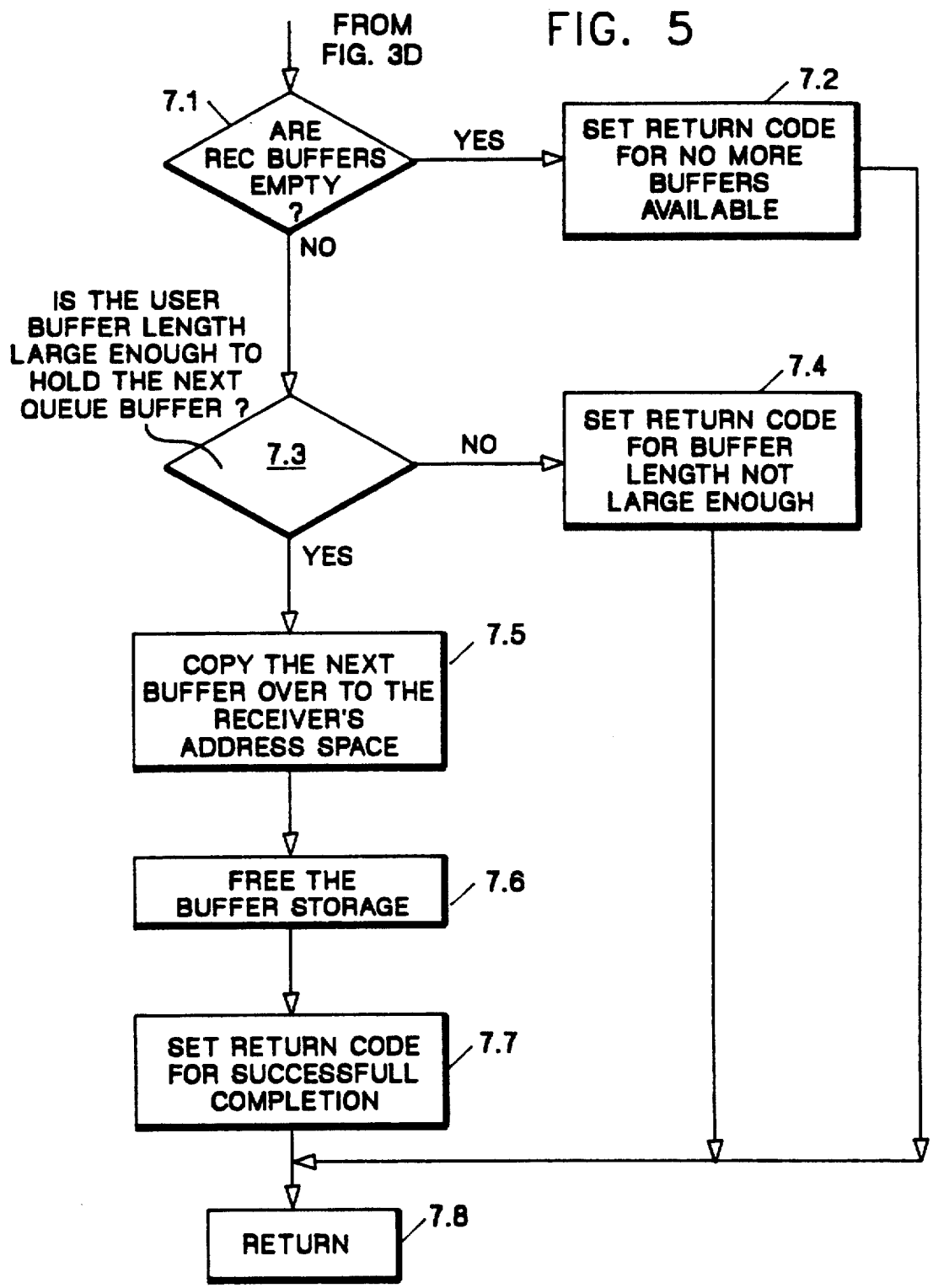
FIG. 5 is the detailed flow chart of that portion of FIG. 1 denoted as program D.

Program D, (7 in FIG. 1) is shown in FIG. 5. It may be executed by Program B as shown in box 5.32, FIG. 3C, to process requests from user programs of type 22 as will be described later. This is the type of request which is presented to request retrieving a data buffer of information previously stored in a buffer queue for a given receiver program. Program D, checks, in box 7.1, FIG. 5 the receiver buffer queue within the communication facility program memory area to see if there is a message available for reception. It will also check in 7.3 to see if whatever buffer length has been specified by the receiver program is large enough to hold the incoming data buffer contents. It will then copy in 7.5, the data buffer contents in the intermediate memory of the communciation facility program over into the receiver program's memory area and will release, in 7.6, the data buffer storage for reuse in the communication facility memory area.

Figure 6:
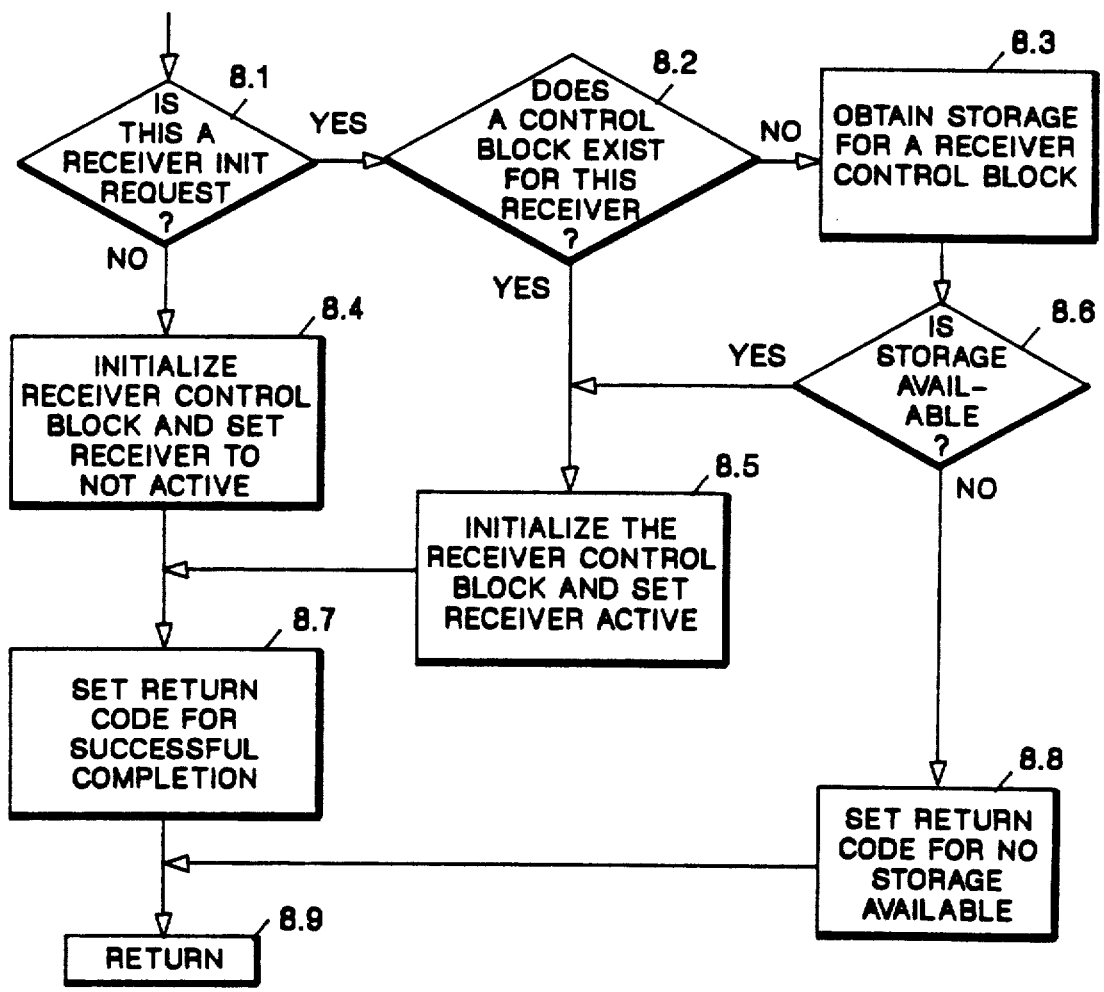
FIG. 6 is that portion of FIG. 1 denoted as program E.

Program E as described in detail in FIG. 6 will be executed by the Program B, box 5.31, FIG. 3, in order to process user program requests of types 4 and 9. If the request from the user is to set a receiver to an inactive state, request type 9, then Program E sets, in 8.4 the receiver status to not active. If the request is to define or initialize a program as a receiver, request type 4, and the receiver has already been defined, it sets, in box 8.5, the receiver status to active, but if the receiver has not already been defined, it will perform the initialization in 8.3 for the receiver and set the status active in 8.5.

Figure 7:
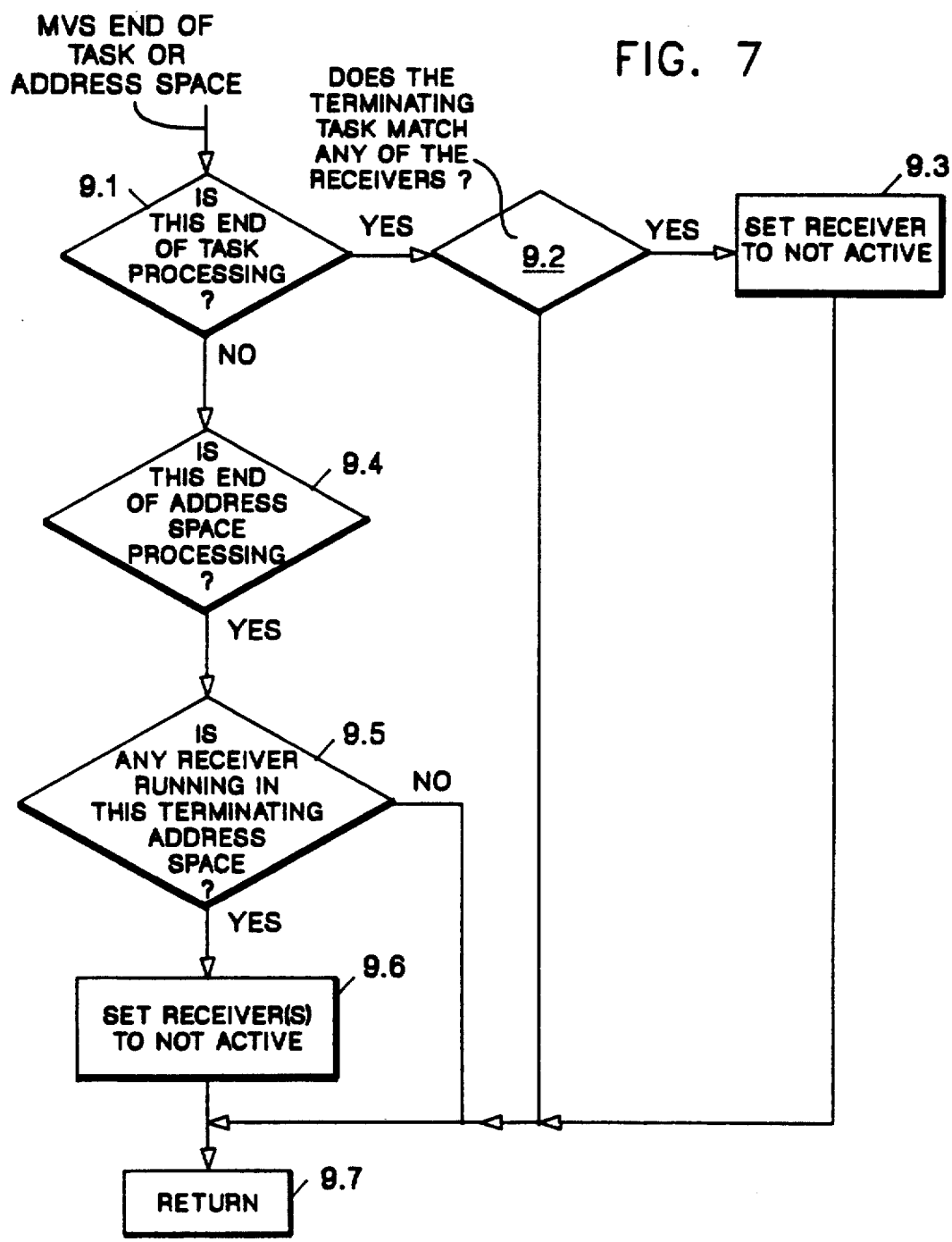
FIG. 7 is the detailed flow chart for that portion of FIG. 1 denoted as program F.

Program F is shown in FIG. 7, and is executed by the system whenever a user task or memory area is terminated in box 9.1, 9.2 or 9.4. If the terminating task matches in box 9.2 that of one of the defined receivers, the receiver's status will be set to not active in box 9.3 and if the terminating user's memory area matches in box 9.5 one of the receivers, the receiver's status will also be set in box 9.6 to not active.

Figure 8:
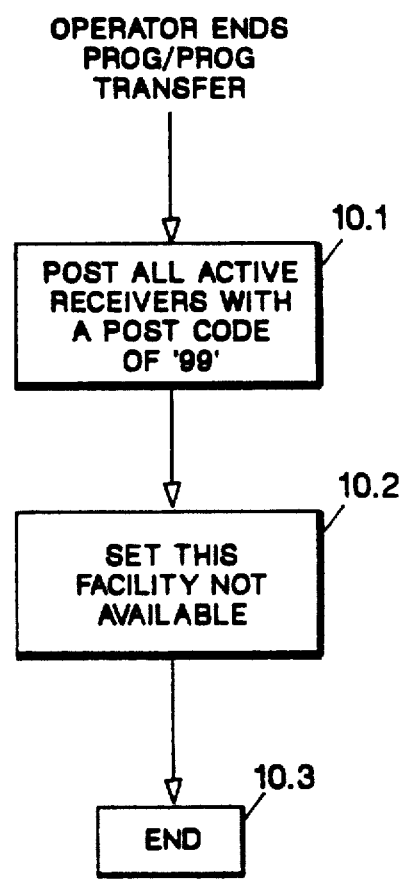
FIG. 8 is the flow chart for that portion of FIG. 1 denoted as program G.

Program G is shown in FIG. 8, is executed by the system when the intermediate memory area is being terminated. It notifies all active receivers by posting a code in the receivers' ECBs in box 10.1, that notifies them that the intermediate memory area is terminated.

The processing path and functions are defined by the specific Request Parameter Buffer indicated by the user program's CALL command. The contents of the Request Parameter Buffer fields are identified in Table 1 and have the function or meaning as defined in Table 2 below.

TABLE 2

| | |
|---|---|
| RPB-LEN → | Length of this RPB in bytes (including this field). (4-byte binary value). (i.e. 40). |
| TYPE → | Request type. (2-byte binary value). |
| | '1'- Request to check if the communication facility is available to process user requests. |
| | '2'- Request to check if a receiver program, as specified in RECEIVER-ID, is active. |
| | '4'- Request to define and initialize a receiver. |
| | '9'- Request to set a receiver to not active. |
| | '12'- Request to send a copy of a user generic alert buffer to the Network Management program for processing. The user alert buffer should include the 8-byte Network Management Vector Transport header. |
| | '14'- Request to send a copy of a user data buffer to the receiver. |
| | '22'- Request to obtain a data buffer which was stored in the buffer queue for a receiver. |
| RECOPT → | This is a recovery option indicator. (2-byte binary value) |
| | '0'= No recovery is requested. |
| | '1'= To request that a Recovery Routine is provided during this processing. |
| RETCODE → | Processing return code. (4-byte binary value). |
| | '0'- Request completed successfully. |
| | '4'- Request completed successfully. The receiver program is not active. (Or the Network Management Alert Receiver program is not active if request type '12' is used). |
| | '10'- The communication facility is available to process user requests. |
| | '14'- The receiver program is active. |
| | '15'- The receiver program is not active. |
| | '16'- The receiver program is already active. |
| | '20'- Invalid request type. |
| | '22'- User program not executing in primary addressing mode. |
| | '23'- User program is not authorized. |
| | '24'- The communication facility is not active. |
| | '25'- ASCB address is incorrect. |
| | '26'- Receiver program is not defined. |
| | '28'- The communication facility does not support user request. |
| | '30'- No data buffer available for the receiver. |
| | '31'- User buffer size is not large enough to hold the awaiting data buffer. |
| | '32'- No storage available. |
| | '34'- The user alert buffer length exceeds 512 bytes. |
| | '35'- The receiver buffer queue is full. |

TABLE 2-continued

| | |
|---|---|
| | '36'- A Recovery Routine cannot be established as requested. |
| | '40'- Invalid SENDER-ID or RECEIVER-ID. |
| | '90'- Process error occurred. |
| WORK-ADR → | The address of the work storage space in memory required for the communication facility service module. The work storage must be 128 bytes in length (4-byte binary value). |
| SENDER-ID → | 8-character ID of the sender. (e.g. user module name, program name or product name). |
| ASCB-ADR → | The address of the Address Space Control Block (ASCB) of the receiver program. (4-byte binary value). |
| TCB-ADR → | The address of the Task Control Block (TCB) of the receiver program. (4-byte binary value). |
| ECB-ADR → | The address of the Event Control Block (ECB) which a receiver program will wait on to be posted when data buffers arrived. (4-byte binary value). |
| BUFFQ-L → | The maximum number of outstanding data buffers allowed for a receiver buffer queue. (4-byte binary value). |
| RECEIVER-ID → | 8-character ID for the receiver program. |
| BUFF-LEN → | Length of the user data buffer. (4-byte binary value). |
| BUFF-ADR → | The address of the user data buffer. (4-byte binary value). (If using request type '12', the user alert buffer should include the 8-byte NMVT header). |
| AUTH-IND → | Authorization Indicator. (2-byte binary value). '0'- Receiver is initialized as non-authorized. '1'- Receiver is initialized as authorized. A sender program must be APF-authorized in order to send data buffers to an authorized receiver. |

Table 1 above specifies the byte position within the Request Parameter Buffer fields and defines the meaning ascribed thereto. The request types, as shown in Table 2, are arbitrary codings with the meanings as defined for each of the request types shown. The recovery codes and the return codes also are arbitrary and are defined as shown. Other indicators and pointers are as defined in Table 2.

The sender ID and receiver ID, bytes 17-24 of the RPB and 25-32 of the RPB as shown in Table 1, must be between one and eight characters in length in this embodiment. These ID's consist of alphanumeric characters or special characters chosen arbitrarily by the user. For operation of the programs that will be described herein, if a given ID is not eight characters in length it is left justified and padded with blank characters. For all types of requests by any user, control of program execution is returned to the user's requesting program following execution of the CALL command.

For request type 1, the parameters required are the RPB length and type and the return code can be any of 10, 24, or 28. For request type 2, the required parameters are the RPB length, type, work address and receiver ID, and the return code can be any of 14, 15, 24, 26, or 28.

For requests of type 4, the required buffer parameters are length, type, recovery option, work address, address space control block address, buffer queue limit, task control block address, the receiver ID, and the authorization indicator. The buffer queue limit is used to specify the maximum number of outstanding data buffers that will be permitted for a given receiver's buffer queue. If this limit is exceeded, the sender's data buffer of information will not be accepted by the communication facility program and the return code of 35 will be returned. The return codes can be 0, 16, 23, 24, 28, 32, 35, 36, or 40 for this type of request. When the request is completed successfully, the ECB address will contain the address for the ECB for the receiver program. This event control block is posted for execution when the data buffer of information arrives. The user program desiring to send the buffer must be APF authorized in order to use this type of request.

For request type 9, the required parameters are: length (RPB-LEN), TYPE, recovery option (RECOPT), work address (WORK-ADR), Buffer Queue Limit (BUFFQ-L), ASCB-ADR, and RECEIVER-ID. The BUFFQ-L is used to specify the maximum number of outstanding data buffers of data that can be accepted for a receiver while it is not active. If this limit is exceeded, the sender's buffer of data will not be accepted and the return code will be 35. Return codes can be any of 0, 15, 23, 24, 25, 26, 28, 35, 36, or 40. A sender program can still send data buffers to an inactive receiver program, so long as the receiver's buffer queue as defined is not full. However, the sending program will receive a return code of 4 to indicate that the receiver program is currently not active. User programs should be APF authorized in order to use this request.

For request type 12 the required parameters are: RPB-LEN, TYPE, RECOPT, WORK-ADR, SENDER-ID, BUFF-LEN and BUFF-ADR. The return codes can be any of 0, 4, 23, 24, 26, 28, 32, 34, 35, 36, or 40. A user program can use this request type to send a copy of an alert buffer data to a network management program for processing.

For request type 14, the required RPB contents are: RPB-LEN, TYPE, RECOPT, WORK-ADR, SENDER-ID, RECEIVER-ID, BUFF-LEN, and BUFF-ADR. Return codes can be 0, 4, 23, 24, 26, 28, 32, 35, 36, or 40. As before, a sending program can still send data buffers of information to an inactive receiver program, but a return code indicating inactivity of the program will be sent back to the requestor.

For the request type 22, the required RPB contents are: RPB-LEN, TYPE, RECOPT, WORK-ADR, ASCB-ADR, RECEIVER-ID, BUFF-LEN, and BUFF-ADR. The return codes can be 0, 23, 24, 25, 26, 28, 30, 31, 36, or 40. The buffer address should be the address of a buffer area within the receiver program address space where an incoming data buffer may be copied. If this request is successful, the sender ID field will contain the identification of the sender program and the buffer length will contain the length of the incoming data buffer. If the specified buffer length is not large enough to hold the incoming data for the intended receiver, the return code will be 31 and the length of the incoming data buffer will be placed in the buffer length field. In this case the receiving program should obtain another buffer large enough to hold the incoming data buffer and try the request again.

Returning to FIG. 1, the communication facility program may be seen to actually be constituted by all of the subroutines including programs A through G as depicted in FIG. 1. Each of these programs resides within specified areas of memory within the same processor system, as do the sender program and the receiver program. The individual program portions A through G will now be described with reference to FIGS. 2-8 where the detailed flow chart for each subroutine is illustrated.

Turning to FIG. 2, the detailed flow chart for Program A (4 in FIG. 1) the first portion of the communication facility program is shown. The operation of Program A is self explanatory beginning at the top of FIG. 2, box 2.1, where Program A receives the RPB from a user, sender or receiver program. It may be seen that Program A saves in box 2.2 the user's program registers if desired, checks in box 2.3, to see whether the remainder of the communication facility program and memory space is available (if not available, it sets a return code in 2.4), checks, in box 2.5, on whether the request presented is a query facilities request and, if so, sets a return code in box 2.6, or executes in box 2.7 and 2.8 the user's request by utilizing the processing module Program B as shown. It also returns control, in box 2.9 and 2.10 to the user program as its final step, as shown.

FIG. 3 illustrates the detailed processing flow of Program B (5 in FIG. 1) beginning from the top box 5.1 where it receives its initiation from Program A. FIG. 3 has various entry and exit points marked with encircled A, B, X as shown. Program B checks in box 5.1, as to whether the user's request type as indicated in its RPB is valid (and if not valid, it sets a return code in box 5.2), whether an initiation in box 5.6 or termination of a receiver program is requested. It validates receiver identification in box 5.7 and if invalid, sets a return code in box 5.8. It finds a receiver anchor control block in box 5.9. It executes the appropriate action of either defining or terminating a receiver as in existence, box 5.31 checks in box 5.3 to see whether the request is to retrieve a buffer of information or to send a buffer of information or to send an alert, box 5.3 through 5.5 or to initiate or terminate as a receiver in box 5.6 through 5.8 and executes in box 5.32 the dequeueing routine D, or the receiver initialization/terminate routine E in box 5.31, or the queueing portion Program C in box 5.29 as indicated.

The queueing program is entered as shown in FIG. 4 for program module C by initiation from Program B. This routine handles loading of receiver buffer queue within memory space of the communication facility program. This is accomplished by copying a sender's data buffer in a sender's memory area into the facility's memory area in boxes 6.1 through 6.10.

The dequeueing program D is shown in FIG. 5.

Dequeueing Program D FIG. 5, receives its input from Program B FIG. 3 and operates as illustrated. No description is needed as the FIG. 5 is self-explanatory.

Initiation or termination of a receiver is handled by the Program module E, FIG. 6, which receives its input from Program B, FIG. 3 as shown in FIG. 6. It handles definition or termination of a given user program as a defined receiver to the communication facility program. No further description is needed, as FIG. 6 is also self-explanatory.

FIG. 7 illustrates the flow for processing of task or address space termination for Program F (9 in FIG. 1) as shown in FIG. 1. It is executed by an end of task or end of memory address space function from the processor. It has the function of setting the defined receiver to "not active" and returning control to the caller program. The flow of FIG. 7 in boxes 9.1 through 9.7 is also self-explanatory.

FIG. 8 illustrates the subroutine Program G(10) from FIG. 1 which is initiated by an operator requiring an end of the program to program information transfer process.

As will be appreciated from the foregoing discussion, the program to program communication facility program does not require sender programs to be predefined and does not require set up or maintenance of a "session" in order for communication to occur. Once an intended receiver program has been defined to the communication facility by defining itself, any number of sender programs can start to communicate or send data to the receiver program. A receiver program is allowed to specify to the communication facility whether intended sender programs must be APF authorized in order for communications to be sent to it or not. When sender programs wish to communicate or send data to a receiver, the intermediate communication facility program copies the sender's data into a receiver's buffer queue within the communication facility program's address space, notifies the receiver that it has incoming data, and returns control to the sending program. Unlike typical "session" activity, a sender program doesn't have to wait for the receiver program to receive its data; it can start to send data to the same receiver again or to another receiver as soon as return of control is obtained. The receiver can specify a limit for the number of data buffers of information that the intermediate communication facility program should hold for it within that receiver's buffer queue. Similarly, unlike a "session protocol, a receiver can retrieve its data for processing whenever it is ready. Whenever the receiver issues a retrieve data request, the communication facility will copy the data, one data buffer for each request, into the receiver's address space and memory.

Sender programs can still send data to a receiver program even when the receiver program is not currently active. The intermediate communication facility program may accept and hold data for an intended receiver and return a status code to notify the sender program that the receiver is not currently active. The receiver program itself can notify the intermediate communication facility program that it is no longer active and it can specify a limit as to the number of data buffers of information that the communication facility program should accept and hold for it while it is in the inactive state.

The communication facility program detects whenever a receiver program terminates normally or abnormally and will set the appropriate status for the receiver to not active.

From the foregoing, it will be appreciated that a high level, easy to use program to program communication apparatus and technique have been described that can be used in any type of computer system by programs which use any arbitrarily desired high level programming language that can support standard program call operations. The call operation calls upon the intermediate program to program communication facility program itself entailing modules A-G as illustrated and described in detail and supports asynchronous, full duplex and non "session" oriented communication between user and receiver programs or machines as will be readily appreciated.

In view of the foregoing description and indication of applications for the preferred embodiment of the invention, what is set forth in the claims which follow is intended by way of description and not of limitation.

What is claimed is:

1. In a computer system having an addressable memory, a processor, and a plurality of resident executable processor programs, a method of communicating data in a full duplex mode without previously defining a session between said processor programs from a first of said processor programs acting as a sender to at least a second of said processor programs acting as a receiver, said method comprising the steps of:
   storing a communication facility program in said addressable memory;
   calling said communication facility program from said second receiver program, said second receiver program identifying both itself and its function as a would-be receiver to said communication facility program;
   calling said communication facility program from said first sender processor program in said computer system and delivering simultaneously to said communication facility program data and an indication of a requested function; and
   requesting, by said second receiver processor program having said requested function, delivery by said communication facility program of any data for said second receiver processor program.

2. The method of claim 1 further comprising a step of:
   copying at said communication facility program said sender program's data into address space of said communication facility program allocated for data destined for receiver programs.

3. The method as described in claim 2, further comprising a step of:
   notifying by said communication facility program to a said receiver processor program having said requested that data awaits said receiver program in said communication facility program address space.

4. The method as described in claim 3, further comprising steps of:
   accessing by said receiver program the address space of said communication facility program and retrieving therefrom data by copying said data into said receive program's address space.

5. A method as described in claim 1 or 2 or 3, wherein:
   said calling of said communication facility program by a sender or a receiver program includes a call command, the name of the communication facility program being called and a communication parameter specification having fields of information defining the length of the specification and the type of request being presented.

6. A method as described in claim 5, said specification further containing fields of data for the work address of the storage area required for the communication program service module and an identification of the receiver which is destined to receive or which is requesting communication.

7. A method for permitting data transfer in a full duplex mode between a first program and a second program resident in a computer system having an addressable memory and processing means without requiring knowledge by the first program of an address, physical location or active status of the second program, comprising the steps of:
   storing a communication facility program in the addressable memory;
   registering the second program as a receiver in the communication facility program upon the second program identifying itself and its function as a would-be receiver to the communication facility program;
   sending, simultaneously, both data and a function request intended for the second program from the first program to the communication facility program;
   storing the data and the request received from the first program by the communication facility program; and
   delivering the data and the request intended for the second program to the second program upon a request from the second program, the request to be issued when the second program is active.

8. A method according to claim 7 further comprising the step of:
   the communication facility program notifying the second program that the data is available.

* * * * *